United States Patent [19]

Stopka

[11] 3,904,521

[45] Sept. 9, 1975

[54] METHOD AND APPARATUS FOR PURIFICATION

[76] Inventor: Karel Stopka, 2735 McWillis, Montreal, Quebec, Canada

[22] Filed: Oct. 11, 1973

[21] Appl. No.: 405,848

Related U.S. Application Data

[63] Continuation-in-part of Ser. No. 137,926, April 27, 1971, abandoned.

[30] Foreign Application Priority Data

Oct. 12, 1972 Canada.................................. 153742

[52] U.S. Cl. .................. 210/44; 210/47; 210/63; 210/192; 210/199; 210/218; 210/219; 210/221

[51] Int. Cl. ........ C02b 1/20; C02b 1/38; C02c 5/04

[58] Field of Search .......... 210/15, 44, 47, 63, 192, 210/199, 218, 219, 220, 221; 261/91, 92, 112, 115, DIG. 42; 21/74 A, 102 R

[56] References Cited

UNITED STATES PATENTS

| | | | |
|---|---|---|---|
| 996,560 | 6/1911 | Bradley | 210/192 |
| 1,047,534 | 12/1912 | Joseph | 210/192 X |
| 1,090,044 | 3/1914 | Fuss | 261/DIG. 42 |
| 1,462,363 | 7/1923 | Christensen | 261/DIG. 42 |
| 3,142,296 | 7/1964 | Love | 261/112 X |
| 3,336,099 | 8/1967 | Czulak et al. | 210/63 X |
| 3,505,188 | 4/1970 | Pan | 210/44 X |
| 3,523,891 | 8/1970 | Mehl | 210/47 X |
| 3,622,508 | 11/1971 | Komline | 210/44 X |
| 3,664,951 | 5/1972 | Armstrong | 210/44 |
| 3,772,188 | 11/1973 | Edwards | 210/15 |

*Primary Examiner*—Charles N. Hart
*Assistant Examiner*—Robert H. Spitzer
*Attorney, Agent, or Firm*—Seidel, Gonda & Goldhammer

[57] ABSTRACT

A method and apparatus are provided for purifying flowing water containing waste utilizing ozone wherein the water is propelled into an ozone containing atmosphere in the form of droplets and to provide a film of the water on the walls of the treatment chamber; efficient contact between ozone and waste is obtained in a short period; the water may additionally be treated to remove suspended particles by flotation of the particles with hydrogen bubbles formed by electrolysis and removal of the floating sludge.

27 Claims, 15 Drawing Figures

METHOD AND APPARATUS FOR PURIFICATION

This application is a continuation-in-part of my application Ser. No. 137,926, filed Apr. 27, 1971, now abandoned.

BACKGROUND OF THE INVENTION a. Field of the Invention

This invention relates to a method and apparatus for the treatment of water containing waste.

The method and apparatus are particularly suited to the purification of municipal waters containing sewage and industrial waters containing waste materials, for example, in the removal of cyanides from the effluent of gold cyanidation mills. The method and apparatus are thus of considerable significance in preventing pollution of the environment.

b. Description of the Prior Art

Treatments are known for purifying a mass of water containing waste in which an oxidizing gas, such as chlorine, oxygen or ozone is bubbled slowly through the water in a holding tank.

Such methods require the provision of large holding tanks, scrubbers and, often, high pressure injection systems for injection of the oxidizing gas.

Further, these known methods require a prolonged period of treatment of the water with the oxidizing gas which is generally at least 30 minutes, and may be several hours; these methods have the further disadvantage in that, since each bubble of oxidizing gas travels upwardly through the water, only the water in its path is oxidized.

Another known method of treating water containing waste, which is used particularly in the treatment of sewage comprises mixing the sewage with an oxygen containing gas in the presence of aerobic bacteria.

The organic matter is biologically oxidized by the bacteria and the solids are separated by, for example, gravity settling thus allowing purified effluent to be decanted. In some cases the effluent is disinfected by chlorination before being discharged into a stream or other body of water. It will be appreciated that this method suffers the disadvantage that large holding tanks are required for the treatment. This treatment is commonly known as the activated sludge process.

A further deficiency of the activated sludge process is that bacteria which escape sedimentation and removal may include types of bacteria that are potentially hazardous to health. In this case the use of a disinfecting treatment for the effluent is necessary, and care has to be taken to prevent the BOD (biological oxygen demand) and COD (chemical oxygen demand) of the effluent from contributing to an oxygen deficiency in the body of water into which it is discharged.

From U.S. Pat. No. 1,420,046 — D. G. MacGregor et al. it is known to subject a liquid such as water to dilute ozone. MacGregor employs a tall tower made of glass or other transparent material having a centrally located upwardly extending discharge pipe for introduction of water or other liquid in the tower; the outlet of the discharge pipe is located in the upper part of the tower, and is partially enclosed by a lower perforated plate and an upper plate.

In the operation of MacGregor's method, the mass of water to be treated is pumped through the discharge pipe from which it emerges into the partial enclosure in the upper part of the tower; the water then falls through the perforated plate to the bottom of the tower. Simultaneously air containing ozone is passed upwardly through the tower and the whole is exposed to the action of the light rays passing through the glass tower.

MacGregor's method thus involves raising a mass of water to a great height and allowing it to fall against an upflowing stream of air containing ozone. Thus MacGregor essentially produces a curtain of water, rather like a waterfall. Such a curtain of water does not allow for satisfactory contact between the water and the ozone, and consequently, does not use the expensive ozone to its best advantage.

Further, the poor economics of a process such as MacGregor's for the treatment of municipal and industrial waters, which necessitate the expenditure of considerable energy to raise tons of water to a great height in a glass tower will be readily evident.

While it cannot be stated definitely that MacGregor's process was never used in practice, absence from our cities of tall glass towers belching forth sewage is perhaps significant.

From U.S. Pat. No. 1,462,363 — Christensen, it is known to bring a liquid spray into intimate contact with gaseous media to bring about absorption of some of the gaseous media in the liquid. In Christensen's method a fine spray of liquid is produced by a revolving cylinder arranged so as to just touch the upper surface of the body of liquid. A film of water adheres to the cylinder as it rotates, and this is thrown from the cylinder by centrifugal force into the gaseous media. The location of the cylinder with respect to the water is critical, and Christensen seeks to avoid any agitation of the body of water; this is discussed at length by Christensen.

There is a brief mention by Christensen of the use of his method to treat sewage. However, it is quite evident Christensen's method could only provide aeration of the bulk of liquid by introduction of any oxygen absorbed in the small amount of spray on the return of the spray to the body of water. Clearly such a method of introducing oxygen into the body of water would be highly inefficient, since it would be possible to introduce only a very small amount of oxygen, and then only at the top surface of the water; the body of the water would remain untouched.

It would, of course, be quite impractical to utilize Christensen's method to treat water containing waste on a large scale by gently projecting a fine spray from the surface of the water into air. Apart from the criticality of the location of the revolving cylinder with respect to the continuously flowing mass of water, only the top surface of water would be treated and the body of water would remain untouched.

It is evident that the method of Christensen is incapable of application to the large scale economic treatment of municipal and industrial waters containing waste.

SUMMARY OF THE INVENTION

The present invention in one aspect provides a method and apparatus, which utilizes an ozone containing atmosphere for the oxidation of waste materials, wherein efficient contact between the ozone and the water containing waste is produced.

In this method and apparatus the water containing waste is propelled in a chamber in the form of small droplets into an ozone containing atmosphere at least some of the droplets hitting the walls of the chamber. The droplets, which hit the chamber walls form a thin film thereon, which runs downwardly to the body of water.

The droplet size should be such that a majority of the droplets will not remain suspended in the atmosphere forming a humid atmosphere but will fall back to the body of water, so that purified water is returning continuously to the body of water.

There is no real upper limit to the size of the droplets except that determined by the desirability of presenting the maximum possible surface area of water to the ozone containing atmosphere consistent with the requirement that a humid atmosphere of suspended droplets be avoided. Clearly, if the droplet size is increased, the surface area of water for contact with the ozone will decrease.

A suitable range of droplet size is found to be from about 5 to about 50 microns. Within the limits previously recited the size of the droplets will suitably be determined by the ease of oxidation of the materials in the waste. If the materials in the waste are oxidized slowly, then droplets at the lower end of the size range are preferred, since this increases the available surface area, and also the time which the droplet is in the atmosphere in contact with ozone.

For more easily oxidized materials droplets of larger size will be appropriate, since prolonged contact with the ozone is not necessary; the larger droplets will descend more quickly to the body of water than will the smaller droplets.

Determination of the ease of oxidation of the waste material can be determined by laboratory testing of samples of the water, which is to be treated. Similarly determination of the amount of ozone necessary for treatment of the waste can be determined by testing samples in the laboratory; this avoids loss of the unstable ozone. Generally an effective atmosphere for sanitary wastes will contain 20 ppm of ozone. In the presence of iron, manganese, phenol, cyanide, high COD and acidy waters, the dosage of ozone may go as high as 200 ppm. A suitable range for the ozone content of the atmosphere will be about 1.2% by weight to about 2% by weight of the atmosphere.

Thus in this aspect of the invention a large surface area of water containing waste is produced which results in almost instant oxidation of the waste in the droplets and the film allowing for efficient contact with the ozone; the surface area comprises the surface area of the droplets, and the surface area of the film of water on the chamber walls.

Mention has been made above of "instant" oxidation; the term "instant" is, of course, relative. The contact time between a droplet and the ozone containing atmosphere will be, for example, of the order of 12 seconds in a chamber 10 feet, by 2½ feet during which oxidation of the waste in the droplet occurs; this can be considered as "instant" oxidation in comparison with the prior bubbling treatments, where the time for oxidation is greater than 30 minutes; and may be several hours. The chamber could be between 8 feet to 25 feet high and from 2 feet to 10 feet in diameter. Generally speaking the vertical distance through which a droplet is propelled will be in the range from about 5 feet to about 20 feet.

From a consideration of these distances, it will be appreciated that the necessity of tall expensive towers, such as that of MacGregor et al. as described hereinbefore is avoided.

When the droplets now containing dissolved ozone fall into the liquid it dissolves further into the liquid. This preconditioned liquid is picked up and exposed to a fresh ozone atmosphere in a secondary and subsequent chamber arranged in series. The number of succeeding chambers depends on the degree of contamination of the liquid.

It is desirable to maintain the pressure of the ozone containing atmosphere in excess of atmospheric pressure, suitably from about 4 to about 8 p.s.i. in excess of atmospheric pressure. The liquid feed pressure from the pump should be at 40 p.s.i., while the pressure in the chamber should be maintained at about 0.02 to 0.06 p.s.i. above atmospheric.

The treatment can take place in successive chambers for greater purification.

The apparatus may comprise one or more discreet chambers introduced into the pipeline of the flowing water, or the chamber may be defined in the pipe through which the water is flowing.

Further, each discreet chamber may contain a single means for producing the droplets and propelling them into the ozone containing atmosphere, or it may contain two or more of such means located in different parts of the chamber which may direct the droplets to different parts of the chamber for greater efficiency.

This aspect of the invention provides a method and apparatus for the continuous and rapid oxidation of waste. The apparatus can be readily incorporated into existing sewage or other disposal outlines and avoids the necessity of large holding tanks and towers.

In a further aspect of the invention, there is provided a method and apparatus herein referred to as an electric coagulator, for continuously removing matter from water by flotation.

In this aspect of the invention, the water containing suspended matter is subjected to electrolysis, thereby producing hydrogen bubbles, which ascend to the surface of the water carrying the suspended matter, which is continuously removed.

This method and apparatus may be readily utilized in combination with the aforementioned purifying method and apparatus utilizing ozone. In this case the electric coagulator may be used after the ozone purifying system to remove the suspended oxidized solids; further, the electric coagulator may be used to treat the water prior to its entry into the ozone purifying system; this is particularly useful when oils are present in the water. In other instances electric coagulators may be placed before and after the ozone purifying system.

In particular use of the electric coagulator will be significant when the water contains appreciable amounts of iron, manganese, phenol and sulphate.

Further, use of the electric coagulator is desirable prior to the ozone-purifying, when the water contains slowly oxidizable waste, for example, iron, manganese, phenol and cyanides.

The ozone purifying system and the electric coagulator are described below in greater detail.

BRIEF DESCRIPTION OF THE DRAWINGS

Preferred embodiments of the invention are illustrated with reference to the accompanying drawings, in which.

a. OZONE-WATER PURIFICATION SYSTEM

Figures 1, 4, 5:
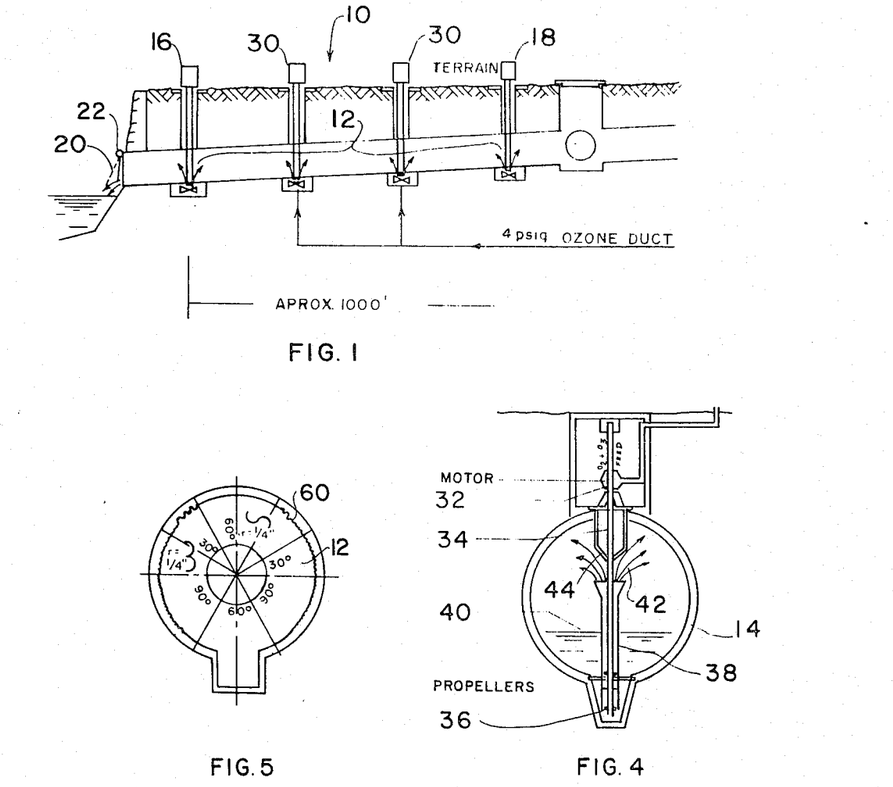
FIG. 1 is a diagrammatic representation of water purification system.
FIG. 4 is an enlarged sectional view taken along the line 4—4 of FIG. 2.
FIG. 5 is a sectional view of a duct for use in the apparatus of FIG. 2.
Figure 2:
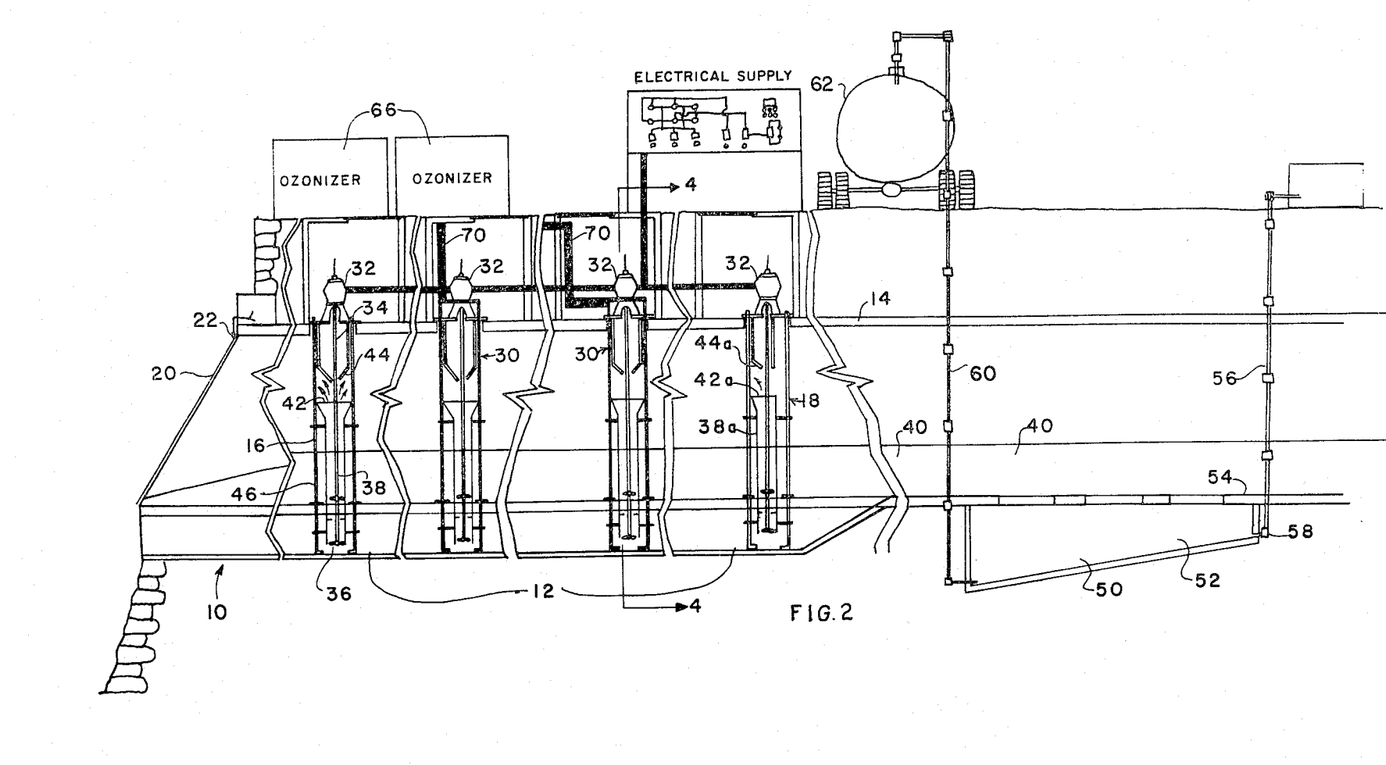
FIG. 2 is a section in greater detail of a water purification system.
Figure 3:
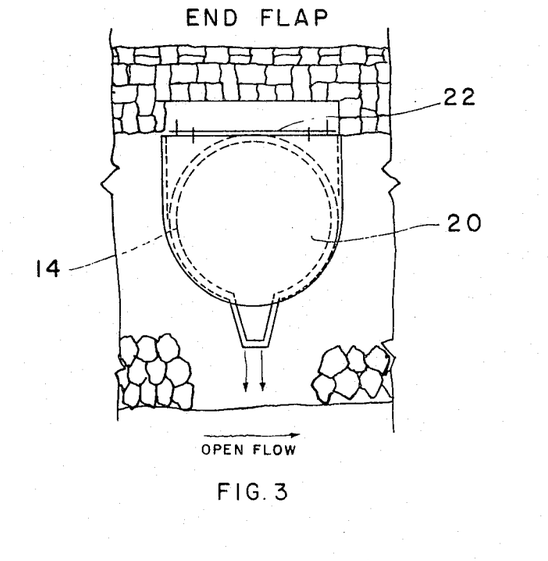
FIG. 3 is an end view of the embodiment of FIG. 2.

Referring in detail to the drawings, in FIGS. 1 and 2 a purifying system indicated generally at 10 includes purification chambers 12 defined in an existing sewage pipe 14 between agitating and propelling devices 16 and 18.

An end flap 20 is provided at the top end of the pipe 14 to aid in preventing outside air currents from entering the purification chambers 12. The end flap 20 which is preferably formed of fibreglass reinforced plastic is attached at the end of pipe 14 by a suitable hinge means 22.

Agitating and propelling devices 30 are provided in the purification chamber 12. The devices 16 and 30 are substantially identical, and therefore only one need be described in detail. Accordingly, the device 16 comprises a motor 32, in this case an electric motor, suitably mounted over an aperture in the pipe 14. The motor 32 drives a vertical shaft 34 mounted in suitable bearings and has one or more sets of propellers 36 secured thereto adjacent its lower end. A cylindrical housing 38, open at its upper and lower ends surrounds the shaft 34 and extends into water containing waste 40 flowing through the pipe 14. The upper end of the cylindrical housing 38 has an inverted frustoconical shape which provides an enlarged mouth 42. Above and spaced from the mouth 42 is a complementary frustoconical baffle 44 which assists in directing fluid upwardly and outwardly as indicated by the arrows while protecting the motor 32. A frame 46 holds the cylindrical housing 38 and the baffle 44 in the required concentric relationship to the shaft 34.

In view of the corrosive effect of ozone and the inhibiting effect that metal has on the oxidation with ozone of waste materials, suitable synthetic resins or plastics are desirably used in place of metal in the fabrication of the components of the apparatus or the metal is covered with a plastic or silicone coating.

The device 18 includes working parts similar to device 16; however, the mouth 42a of cylindrical housing 38a is shaped so as to direct the water containing waste downstream as indicated by the arrows. Similarly, baffle 44a has a complementary shape thus facilitating the projection downstream of the water 40.

The system 10 illustrated in FIG. 2 is provided with a silt trap 50, which includes a sump 52 having an apertured cover 54. A nozzle 58 is connected to a supply line 56 of high pressure water, adapted to project a jet of water beneath the cover 54 and parallel thereto as indicated by the arrows. The silt so collected may be removed through a conduit 60 to a portable tank 62 by means of a conventional pumping system.

Ozonizers 66 are provided adjacent the purification chamber 12; conduits 70 from said ozonizers are adapted to feed ozone to the chambers 12.

Ozone may suitably be fed with oxygen or pre-dried air.

With reference to FIG. 5 a corrugated liner 60 is provided on the interior wall of the purification chambers 12. The liner 60 is suitably constructed of plastic or fibreglass reinforced synthetic resin of a type, which is not subject to deterioration through contact with ozone. The corrugations of the liner 60 assist in breaking up the water into small droplets; further, they slow down the fall of the water thereby increasing the exposure of the water to the ozone containing atmosphere. At the same time, they provide a greater surface area for formation of a film of water.

In the operation of the method and apparatus, water 40 containing waste flows through pipe 14 and into the purification chambers 12; agitating and propelling device 18 agitates the water 40, and propels it upwardly and in a downstream direction into the first chamber 12; in this way, device 18 serves to provide a trap to prevent upstream flow of the ozone-containing atmosphere in the first chamber 12.

Ozone produced in ozonizers 66 is fed in a suitable atmosphere, for example, oxygen through conduits 70 and into the chambers 12, thereby providing an ozone-containing atmosphere in the chambers 12.

The agitating and propelling devices 30 agitate the water 40 and propel it in the form of small droplets into the ozone-containing atmosphere and against the walls of the chambers 12 (i.e. the inner wall of the pipe 14). The final agitating and propelling device 16 acts in a similar manner to devices 30, while at the same time helping to prevent escape of ozone from the chambers 12 in a downstream direction.

The use of pumps to spray the water-containing waste into an ozone-containing atmosphere in a purification chamber is illustrated in FIGS. 6 to 11.

Figures 6, 7, 8:
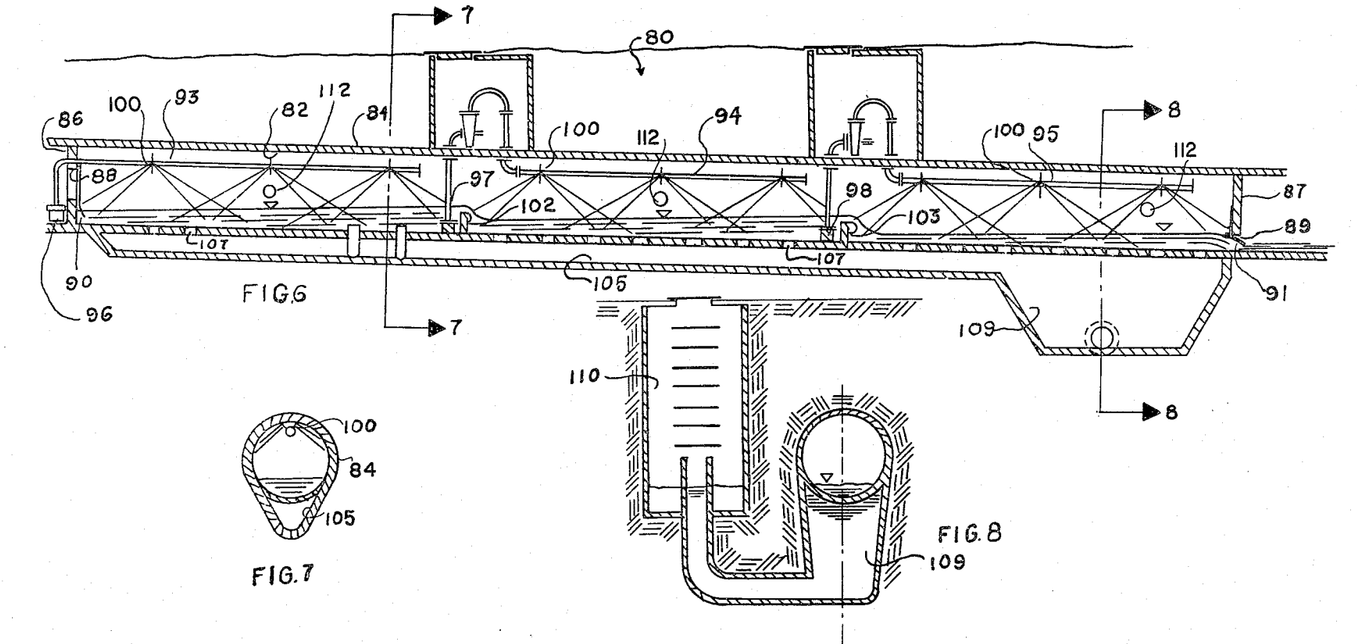
FIG. 6 is a sectional side elevational view of an alternative water purification system.
FIG. 7 is a section taken along the line 7—7 of FIG. 6.
FIG. 8 is a section taken along the line 8—8 of FIG. 6.

With reference to FIG. 6, a purification system indicated generally at 80 includes a purification chamber 82 defined in a modified sewage outflow pipe 84 between apertured end walls 86 and 87.

An inlet 88 and an outlet 89 of the pipe 84 are provided with hanging curtains 90 and 91 of flexible synthetic plastic sheet material.

Partitions 102 and 103 divide the chamber 82 into three treatment zones.

Small diameter conduits 93, 94 and 95 suspended from the upper wall of the chamber 82 are connected to submersible pumps 96, 97 and 98 respectively; spray jets 100 disposed at different angles are located in conduits 93, 94 and 95 along their length.

Located beneath the chamber 82 is a collector pipe 105. Slots 107 in the main pipe 84 interconnect the collector pipe and the chamber 82. A lower end of the pipe 105 is connected to a sump 109, which in turn is connected to a cleanout manhole 110.

Pipes 112 connected to a source of an ozone-containing atmosphere extend into each of the three treatment zones defined by partitions 102 and 103 in chamber 82.

In operation of the system illustrated in FIGS. 6 to 8, water containing waste flows through sewage pipe 84 and into purification chamber 82 where it is forced by the pumps 96, 97 and 98 through the conduits 93, 94 and 95 from which it emerges through spray jets 100 in different directions (as indicated diagrammatically in FIGS. 6 and 7), thereby producing small droplets and breaking the waste into small particles. The ozone-containing atmosphere is introduced to the purification chamber 82 through the pipes 112.

During treatment, coagulation of solid particles in the water takes place in each of the three treatment zones: The solids pass through slots 107 into the collector pipe 105. Movement of the solids along the collector pipe 105 to the sump 109 may be facilitated by the provision of a feed screw hydraulic pressure, screeners or the like (not shown).

Figure 9:
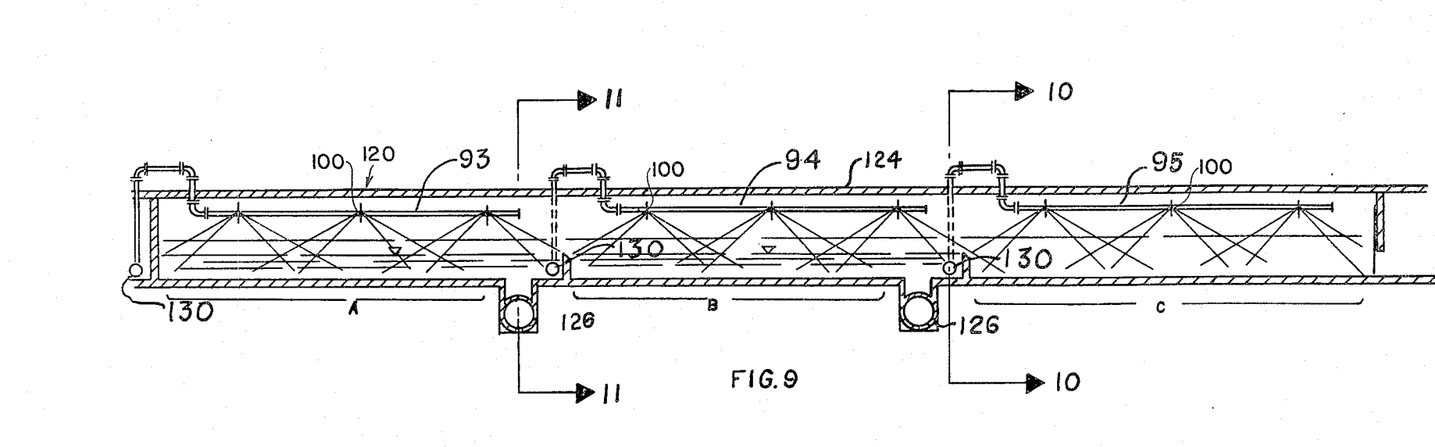
FIG. 9 is a sectional side elevational view of another water purification system.
Figure 10:
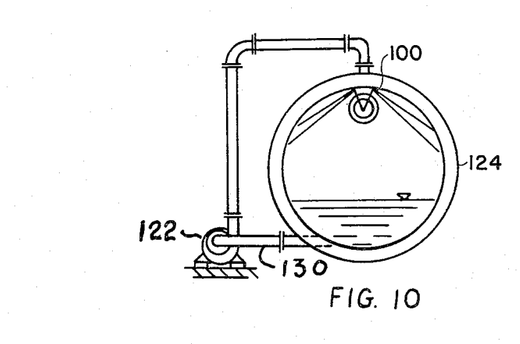
FIG. 10 is a section taken along the line 10—10 of FIG. 9.
Figure 11:
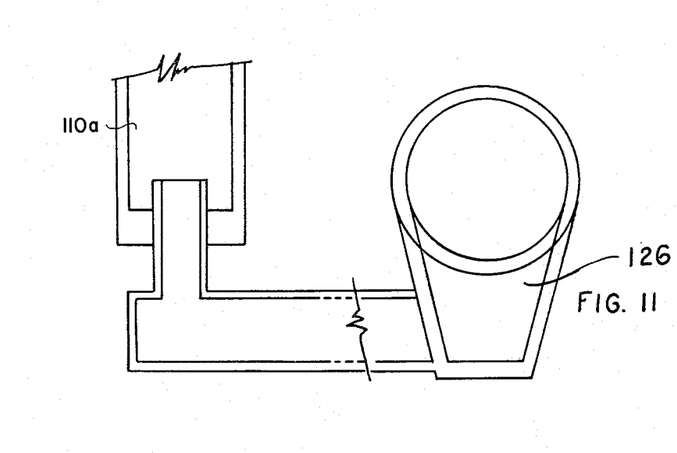
FIG. 11 is a section taken along the line 11—11 of FIG. 9.

With reference to FIGS. 9 to 11 an alternative construction of the purification system of FIGS. 6 to 8 is shown. With reference to FIGS. 9 to 11, a purification system 120 is substantially the same as the system 80 in FIGS. 6 to 8 with the exception that pumps 122 are provided outside of a pipe 124, and sumps 126 for collecting solid material are located in two of the three treatment zones A, B, C. The sumps 126 are connected to cleanout manholes 110a identical to manhole 110 described with reference to FIG. 6.

Conduits 130 extend through the wall of the pipe 124 to the pumps 122, which in turn are connected to conduits 93, 94 and 95 having spray jets 100 similar to those described with reference to FIGS. 6, 7 and 8.

In operation of the purification system illustrated in FIGS. 9 to 11, water containing waste flowing through pipe 124 passes into a conduit 130. The first pump 122 passes the water through conduit 93 and into treatment zone A through jets 100; from treatment zone A, the water passes through a second conduit 130 to a second pump 122 through conduit 94 to treatment zone B. The process is repeated, the water being sprayed into treatment zone C before leaving the treatment zones through the outlet 89. Solids formed during the treatment pass from the pipe 124 to the solid collector sumps 126, and from there to the cleanout manholes 110a.

The multi-stage treatment described with reference to the apparatus of FIGS. 1 to 11 results in the water containing waste being treated repeatedly with an ozone containing atmosphere, thereby reducing the BOD and COD of the water.

b. WATER PURIFICATION SYSTEM INCLUDING ELECTRIC COAGULATOR

Figure 12:
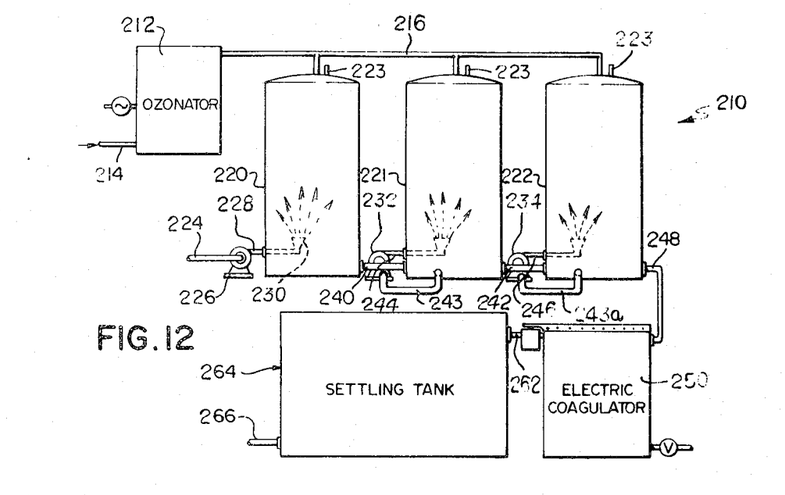
FIG. 12 is a diagrammatic side elevational view of a water purification system in combination with an electric coagulator.

With further reference to FIG. 12, a waste treatment system incorporating an electric coagulator is indicated generally at 210.

The system 210 includes an ozone generator 212, a series of treatment chambers 220, 221 and 222, an electric coagulator 250, and a settling tank 264.

The ozone generator 212 is connected by a conduit 214 to a supply of air or oxygen; the treatment chambers 220, 221 and 222 are connected to the ozone generator 212 by a conduit 216. A pressure relief valve 223 is provided in each of chambers 220, 221 and 222 to maintain an atmosphere in the chambers 220, 221 and 222, slightly in excess of atmospheric pressure, for example, 1 p.s.i. in excess of atmospheric pressure.

A conduit 224 from a source of water containing waste (not shown) is connected to a pump 226, which is in turn connected to an inlet conduit 228, which passes through the wall of the treatment chamber 220. In the interior of chamber 220 the conduit 228 is provided with a nozzle 230 to propel droplets of the water into the chamber 220. It is understood however that other propelling means could be utilized to produce droplets of water in the chamber 220.

Pumps 232 and 234 and their associated conduits and nozzles are substantially identical to pump 228 with the exception that water flows by gravity between chambers 220, 221 and 222, and the pumps 232 and 234 recycle the water in tanks 221 and 222 respectively. The pumps 232 and 234 have preferably at least double the capacity of pump 228.

Chambers 220, 221 and 222 are interconnected by conduits 240 and 242. Conduits 243 and 243a are connected to the inlet sides of pumps 232 and 234 respectively.

Chamber 222 has an outlet conduit 248 connected to the interior of an upper portion of the electric coagulator 250. An outlet conduit 262 extends from the electric coagulator 250 to the settling tank 264, which has an outlet 266 for treated water.

In operation of the process, air or oxygen is fed through conduit 214 to the ozone generator 212. Oxygen feed is preferred in order to obtain maximum efficiency from the ozone generator 212. Ozone is produced in ozone generator 212, and is fed via conduit 216 to the treatment chambers 220, 221 and 222. Pressure relief valves 223 ensure a slight pressure in the treatment chambers. There is thus obtained an ozone containing atmosphere in each of the treatment chambers 220, 221 and 222.

Water containing waste is fed through conduit 224 to pump 226 from which it is pumped through conduit 228 to nozzle 230 from which it is propelled as droplets into the ozone containing atmosphere in treatment chamber 220. Oxidation of the waste in the droplets occurs and the water containing oxidized waste and untreated waste falls to the bottom of chamber 220, and flows through conduit 240 to pump 232, where it is pumped through conduit 244 into treatment chamber 221, and is propelled into the ozone containing atmosphere in chamber 221 in the form of droplets. Oxidation of untreated waste occurs and the water containing oxidized waste and untreated waste falls to the bottom of treatment chamber 221.

At this point, some of the water passes through conduit 243 back to the pump 232 and is recycled to form droplets in the treatment chamber 221. In this way, water containing waste is continuously recycled in treatment chamber 221 to improve the purification.

Water leaving treatment chamber 232 via conduit 242 passes in a similar manner as described above into treatment chamber 222, where recycling of the water also takes place via conduit 243a.

During the treatment most of the ozone is reacted inside the chamber with the waste. When oxygen is used to feed the ozone generator 212, rather than pre-dried air, the surplus of oxygen released at the relief valves 223 could be reused after being cleaned and dried. In other instances, the surplus of oxygen can be reintroduced into an additional chamber placed before the treatment chambers 220, 221 and 222 so that the oxygen can create digestive bacteria system conditions.

Water containing oxidized solids passes from chamber 222 through outlet conduit 248 to electric coagulator 250. Solid particles suspended in the water are removed in electric coagulator 250. The effluent water emerging from the electric coagulator 250 through outlet conduit 262 enters settling tank 264 where solids not removed in electric coagulator 250 may be removed by settling; purified water emerges through water outlet 266.

c. ELECTRIC COAGULATOR

Figures 13, 15:
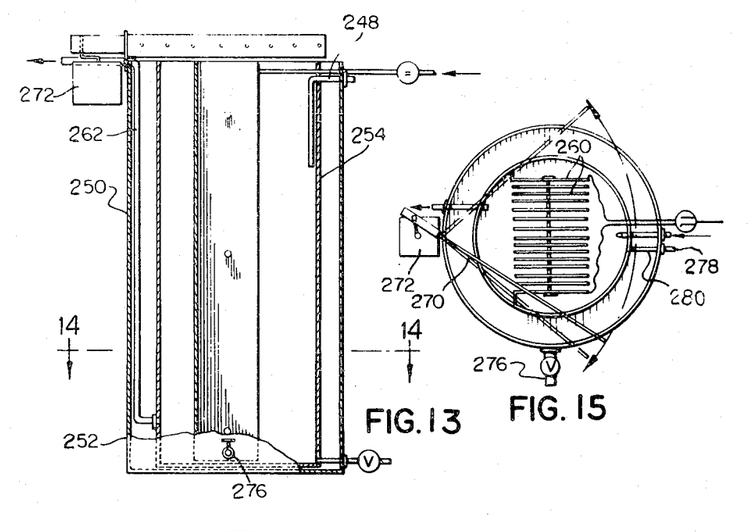
FIG. 13 is a sectional side elevational view of the electrical coagulator.
FIG. 15 is a top plan view of the electrical coagulator.
Figure 14:
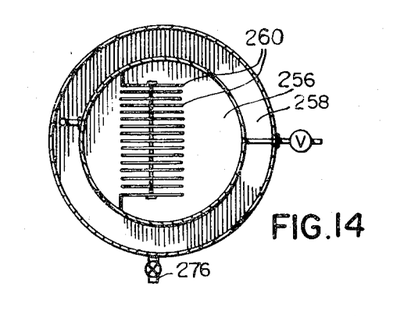
FIG. 14 is a sectional view taken along the lines 3—3 of FIG. 13.

With further reference to FIGS. 13 to 15, there is illustrated an electric coagulator 250. The electric coagulator 250 comprises a cylindrical container 252 having a concentric cylindrical inner shell 254 dividing the container 252 into inner and outer compartments 256 and 258 respectively. Conduit 248 connects the treatment chamber 222 (FIG. 12) with the inner compartment 256 which contains a plurality of electrode plates 260. A supply of direct current of suitable voltage is connected to the plates 260 (see FIG. 15) which are of a suitable metal, for example, iron or aluminum.

An outlet conduit 262 for treated effluent is provided adjacent to and in communucation with a lower portion of inner shell 254; the outlet conduit 262 extends upwardly between the inner and outer shells 254 and 252 and a standpipe is created. Located adjacent the top of container 252 is a reciprocating skimming blade 270 driven by an electric motor and suitable gear drive 272.

A solids removal valve and conduit 276 is located in a bottom portion of container 252 in communication with the outer compartment 258.

In addition, a valve 278 and conduit 280 communicate with the inner compartment 256 to drain this portion of the coagulator 250.

In operation, water from treatment chamber 222 enters inner compartment 256 via conduit 248. The water having been subjected to ozone treatment now contains several parts per million of extra dissolved oxygen and is conditioned for separation of suspended solids in the electric coagulator 250. The electro-negativity of an atom represents the relative attractive force of the atom. Depending on the nature of the waste to be treated, if a chemical accelerator is selected, it will polarize and attract the opposite pole of some other molecule.

Electric current passes through the electrode plates 260 into the water in compartment 256, and electrolysis of the water takes place. Hydrogen is formed at the cathode and ascends to the surface of the water creating turbulence in the water, thereby ensuring good mixing. The hydrogen together with any dissolved oxygen from the ozone purification, and any oxygen produced in the electrolysis transport the suspended solid particles to the surface of the water, thereby forming a sludge layer at the water surface comprising gas bubbles and entrapped, suspended matter. The flow of water into compartment 256 is adjusted so that the sludge layer will be at the top of the inner compartment 256, and is skimmed off by movement of blade 270 as illustrated by the arrows in FIG. 15.

The hydroxide ions generated in the electrolysis of the water precipitate metals in the water as metal hydroxides which help to flocculate and produce flotation of other solids.

The skimmed solids fall into outer compartment 258 from which they can be removed through valve and conduit 276 for disposal or further treatment. Such solids having been almost completely sterilized by the ozone treatment and being odour-free can be used as land fill.

The water treated in the inner compartment 256 is removed from the lower part thereof via outlet conduit 262 from which it may pass to a settling tank as described above, to be safely discharged into a river.

The electric coagulator may suitably be of cylindrical or cubical cross-section, and should be of appropriate dimensions depending on the quantity of water to be treated.

With regard to the electrode plates 260, their number and size is determined by the volume and nature of the water containing waste. Suitably the electrodes are made of metal, for example, iron, copper, aluminum and platinum. Spacing of the electrode plates 260 may vary in accordance with the conductivity of the water containing waste to be treated. The direct current voltage utilized may also be varied depending on the size of the coagulator 250, and the nature of the water containing waste to be treated.

As is evident from the foregoing description, the design of the coagulator 250 is such that it permits the suspended solids to ascend while the clear liquid is removed from a lower portion of the coagulator.

The flotability of the solids may be improved and accelerated by the addition of flotation agents to the water entering the coagulator. The choice of flotation agents depends on the nature of the waste; however, the following are generally suitable: chlorine, ferric chloride, milk of lime, aluminum sulfate, caustic soda, ferric sulfate, copper sulfate, sodium silicate, bentonite, ferrous sulfate.

D. OXIDATION REACTIONS

Oxidation reactions involving ozone are well known. The results of laboratory tests using ozone to treat a film layer of water containing waste in a purification chamber in accordance with this invention produced the following observations:

| Fundamental Reaction | Code |
|---|---|
| $1 O_3 + M = O_2 + |O| + M = O_2 + MO$ | "m" treated toxic<br>"k" reaction constant<br>"a" original molar concentration of ozone<br>"b" original molar concentration of "m"<br>"x" molar concentration of the final resulting "MO" compound |

Based on this reaction, the expression for the overall reaction velocity $r$ is:

II $$r = \frac{dx}{dt} = k(a-x)(b-x)$$

or after an integration, the final resulting concentration of compounds in time $t$ is:

III $$kt = \frac{1}{a-b} \ln \frac{b(a-x)}{a(b-x)}$$

Equation III shows the dependability of the system on relative concentrations of interacting compounds. Since the concentration of treated toxic compounds depends upon the waste water conditions, the decisive factor for the reaction velocity is the relative concentration of ozone in the treatment atmosphere.

The reaction constant differs for each particular interaction of ozone and treated toxic compound, but a firm figure can be determined through the operation of a pilot plant within an existing drainage system using the method of purification of the invention.

The following chemical reactions illustrate the oxidation reactions occurring in the system:

(1) $NH_2^- + O_3 = NO_2^- + H_2O$
(2) $NO_2^- + O_3 = NO_3^- + O_2$
(3) $2SH^- + O_2 = S-S^{2-} + H_2O$
(4) $2SH^- + 3O_3 + 2\ SO_4^{2-} H_2O$
(5) $CN^- + O_3 = CNO^- + O_2$
    $6CN + 4O_3 + 6CO_2 + 3N_2$
(6) $CNS^- + 2O_3 + 2\ OH^- = CN^- + SO_3^2 + 2O_2 + H_2O$
(7) The general reaction for phenol compounds can be shown on the benzene ring itself:

Although this type of reaction works very slowly for benzene itself, for substituted benzene rings (such as phenolic compounds), the reaction constant is much greater. In the above reaction, peroxide decomposes into smaller, harmless open chain components.

(8) The primary and secondary amines (which produces the unpleasant odours) decompose and the resulting split compounds undergo changes according to equations (1) and (2).

(9) The most disagreeable compounds are mercaptans which are converted into disulphides and sulphates when treated with ozone in accordance with equations (3) and (4).

In addition to the above chemical reactions, ozone in the present system, in combination with oxygen, produces a sterilizing effect on waste bacteria, since its high reactivity influences not only amino acid composition and structure (see sub. 8), but the metabolic cycle of sugar decomposition. Laboratory and field tests have shown that a concentration of 25 ppm of ozone in combination with oxygen reduces the B. coli count by over 99% in less than one minute.

e. ALTERNATE EMBODIMENTS

There have been described above various embodiments of an ozone purification system. It will be appreciated that various means for agitating and propelling the water-containing waste could be employed. The following alternatives are considered to be within the ambit of this invention.

a. Rotating discs located in a sunken part of a drain pipe or treatment chamber. The device, when in action, throws the passing water in the form of droplets in all directions and against the walls of the pipe. The walls of the pipe are lined with insertions of corrugated plastic or fibreglass sheeting which will slow down the dropping of the liquid.

b. An agitator with a propeller performs the same functions as the rotating discs. In both cases, electric motors could be placed either directly in the waste of supply pipe, or they could be located on the ground directly above the pipes, or on either side of the pipe outside the pipe wall.

c. Formation of droplets may be achieved through the use of high frequency transducers having Krystals submerged in the water. The high frequency transducers are to be located outside the pipe and through a shaft create high frequency vibration thereby agitating the water inside the pipe or chamber.

d. In other cases, high powered pumps may be submerged in water inside a pipe and the water is thrown by high pressurized pumps against the flow of water, thus creating fountains which are then sprayed in all directions and particularly on corrugated insertions inside the pipe.

e. In still another instance, two jets of water containing waste to be treated are sprayed through nozzles against each other, thus creating droplets.

It will be appreciated that the parts of the purification system, which will be in contact with ozone will be made of a material or be coated with a material which is resistant to the corrosive effects of the ozone.

EXAMPLE 1

In a test model of the water purifying system of this invention, industrial waste containing a variety of cutting oils, lubricants, solvents, including kerosene trichlorethylene hydrochloric acid, picric acid and nitric acid was subjected to treatment. This pilot plant installation had a capacity of approximately 2 gallons per minute and a D.C. voltage of approximately 60 volts was provided on the electrode plates of the electrical coagulator by a variable transformer. In addition, the pH of the untreated waste entering the ozone treatment chambers was adjusted to approximately 6.5 to 7.

Laboratory analysis of the results shown that raw waste entering the purifying system had a chemical oxygen demand (C.O.D.) of 3200 m.g./l and after treatment the C.O.D. had been reduced to 6 m.g./l.

I claim:

1. A method of purifying flowing water containing waste comprising:
   i. providing a chamber for said water to pass through,
   ii. flowing water containing waste through said chamber and providing an ozone containing atmosphere above said water in said chamber,
   iii. agitating the body of water as it flows through said chamber and propelling said water upwardly into said ozone containing atmosphere and against the chamber walls to produce a film of said waste on said chamber walls and small droplets of said water in said atmosphere of a size sufficient to avoid the formation of a humid atmosphere of suspended droplets,
iv. allowing said small droplets and said film to contact said ozone containing atmosphere with consequent oxidation of said waste, and
v. recovering purified water.

2. A method according to claim 1 wherein said agitating and propelling is from a plurality of spaced apart points.

3. A method according to claim 1 wherein the water recovered from step (iv) is passed into a second chamber where the purification method is repeated.

4. A method according to claim 1 wherein said water is passed through successive chambers in each of which steps (ii) to (v) are repeated.

5. A method according to claim 1 wherein said ozone containing atmosphere comprises a mixture of ozone and oxygen.

6. A method according to claim 5 wherein said ozone containing atmosphere comprises ozone in oxygen, said ozone being present in a concentration of about 20 ppm.

7. A method according to claim 1 wherein said atmosphere is at a pressure of 0.2 to 0.6 p.s.i. in excess of atmospheric pressure.

8. A method according to claim 1 wherein said flowing water is flowing through a pipe, and said chamber is defined in said pipe.

9. A method according to claim 8 wherein said chamber is defined by and between means for agitating and propelling said water into said atmosphere in the form of said droplets, said means including an upstream propelling means and a downstream propelling means, said upstream propelling means propelling said water in a downstream direction.

10. A method according to claim 1 wherein prior to flowing said water into said chamber, silt is recovered from the water.

11. A method according to claim 1 wherein said droplets are propelled into said atmosphere a distance such that the contact time of the droplets and the ozone is substantially instantaneous.

12. A method according to claim 1 wherein said droplets are propelled into said atmosphere a distance such that the contact time of the droplets and the ozone is of the order of 12 seconds.

13. A method according to claim 1 wherein said droplets are of a size in the range from about 5 to about 50 microns.

14. A method according to claim 1 wherein water is additionally subjected to a treatment to remove suspended matter by flotation.

15. A method according to claim 14 wherein said treatment comprises:
i. electrolysing a body of said water to produce bubbles of hydrogen,
ii. allowing said bubbles to ascend to an upper surface of the water carrying the suspended matter to form a floating sludge,
iii. continuously removing said sludge from said upper surface, and
iv. recovering clarified water from a lower part of said body of water.

16. A method according to claim 15 wherein said treatment is carried out on said purified water recovered from (v).

17. A method according to claim 15 wherein said treatment is carried out on said water prior to flowing said water into said ozone containing chamber.

18. Apparatus for purifying flowing water containing water comprising
a. a chamber having an inlet and outlet through which water may continuously flow,
b. a source of ozone containing atmosphere, said chamber having an inlet port connected to said source, said chamber having an outlet port for said atmosphere, said inlet and outlet ports being at an elevation above the elevation of said chamber inlet and outlet for water,
c. agitating and propelling means in said chamber for propelling water in the chamber into an ozone containing atmosphere in said chamber and against the chamber walls to produce a film of water on said chamber walls and small droplets of said water in said atmosphere of a size sufficient to avoid the formation of a humid atmosphere of suspended droplets.
d. at least one upstanding conduit having a discharge nozzle at its upper end for discharging water into said atmosphere, the other end of said conduit being connected to said agitating and propelling means for receiving water therefrom,
e. said agitating and propelling means having an inlet at an elevation so that it will be immersed in the body of water below the surface level thereof, and
f. whereby water flowing through said chamber will be agitated and propelled through said conduit into said atmosphere and returned to the body of water in said chamber.

19. An apparatus according to claim 18 including means for maintaining said chamber at a pressure slightly in excess of atmospheric pressure.

20. An apparatus according to claim 18 comprising a plurality of said agitating and propelling means spaced apart.

21. An apparatus according to claim 20 comprising a plurality of said chambers for serial treatment of said water, the outlet of a first chamber being connected by a conduit to the inlet of an adjacent chamber.

22. An apparatus according to claim 18 wherein two or more of said agitating and propelling means are located at different positions in said chamber.

23. An apparatus according to claim 18 wherein said chamber is defined in a pipe between a pair of spaced apart agitating and propelling means.

24. An apparatus according to claim 18 in combination with flotation means for treating water to remove suspended matter by flotation.

25. An apparatus according to claim 24 wherein said flotation means comprises a container for said water and electrodes adapted to be submerged in said water to produce electrolysis of said water, means on an upper portion of said container for removing sludge floating on the water and an outlet connected to a lower portion of the tank for removing clarified water.

26. Apparatus according to claim 25 wherein said container comprises an inner compartment and an outer compartment defined by an inner shell and an outer shell, said electrodes being mounted in said inner compartment, an inlet for said water being connected to said inner compartment; and in which said means for removing sludge comprises a reciprocating skimming blade adapted to skim said sludge into said outer compartment and including a conduit connected to a lower portion of said outer compartment for removal of said sludge.

27. Apparatus according to claim 26 wherein said inlet for water is connected to said outlet in said chamber.

* * * * *